United States Patent [19]
Burkley et al.

[11] Patent Number: 5,253,850
[45] Date of Patent: Oct. 19, 1993

[54] AIRSPRING WITH NON-MOLDED-IN BEAD

[75] Inventors: Thomas E. Burkley, Akron; Edwin L. Haines, Fairlawn; Frank G. Mungo, Cuyahoga Falls; James E. Woodlee, Kent, all of Ohio

[73] Assignee: The Goodyear Tire & Rubber Company, Akron, Ohio

[21] Appl. No.: 894,379

[22] Filed: Jun. 4, 1992

[51] Int. Cl.$^5$ ............................................. F16F 9/04
[52] U.S. Cl. ................................. 267/64.24; 267/64.27
[58] Field of Search ............... 267/64.19, 64.21, 64.23, 267/64.24, 64.27, 152, 153, 292; 188/298; 152/539; 74/18, 18.1, 18.2; 29/450, 451

[56] References Cited

U.S. PATENT DOCUMENTS

| | | | |
|---|---|---|---|
| 779,136 | 1/1905 | Irwin | 267/64.23 |
| 2,874,458 | 2/1959 | Smith | 267/64.27 X |
| 3,057,768 | 10/1962 | McGough | 267/64.27 X |
| 4,174,827 | 11/1979 | Hirtreiter et al. | 267/64.24 X |
| 4,988,082 | 1/1991 | Pees | 267/64.24 |

*Primary Examiner*—Robert J. Oberleitner
*Assistant Examiner*—Lee W. Young
*Attorney, Agent, or Firm*—Marc R. Sion, Sr.

[57] ABSTRACT

A method for producing an airspring which reduces the time of manufacture by the vulcanization of the airsleeve in the absence of beads. After vulcanization of the sleeve, and end portion of the sleeve is wrapped about a bead ring and crimped within an annular rolled portion of at least one end member.

1 Claim, 1 Drawing Sheet

AIRSPRING WITH NON-MOLDED-IN BEAD

FIELD OF THE INVENTION

This invention relates to airspring fluid pressure sleeves and a method of attaching them to end members.

BACKGROUND OF THE INVENTION

Airsprings having crimped-on end members are known, e.g. U.S. Pat. Nos. 3,063,732 and 4,787,608. Heretofore, the fluid pressure sleeves were made with the bead wire or ring molded into them such as illustrated in U.S. Pat. Nos. 2,971,562; 2,874,458; 3,057,768; 3,078,085 and 3,078,086. The thickness of the end portions where the sleeves overlap after being wrapped about the bead wire or ring poses a problem in the vulcanization step where in order to effect a uniform cure of both the overlapped portion and the thinner sidewall portion, it is necessary to cure at a lower temperature and for a longer time.

SUMMARY OF THE INVENTION

In accordance with the practice of the present invention, there is provided a method of assembling fluid pressure sleeve to an end member comprising:
(a) providing a vulcanized elastomeric fluid pressure sleeve;
(b) wrapping an end portion of said sleeve about a bead ring;
(c) placing the wrapped bead ring into an end member; and
(d) crimping said end member about the wrapped bead ring.

There is also disclosed a fluid pressure device having a fluid pressure sleeve connected between a pair of spaced end members, the improvement wherein the sleeve is vulcanized prior to assembly, then an end portion of the sleeve is wrapped about a bead ring and crimped within an annular rolled portion of at least one of the end members.

DETAIL DESCRIPTION OF THE INVENTION

Figure 1:
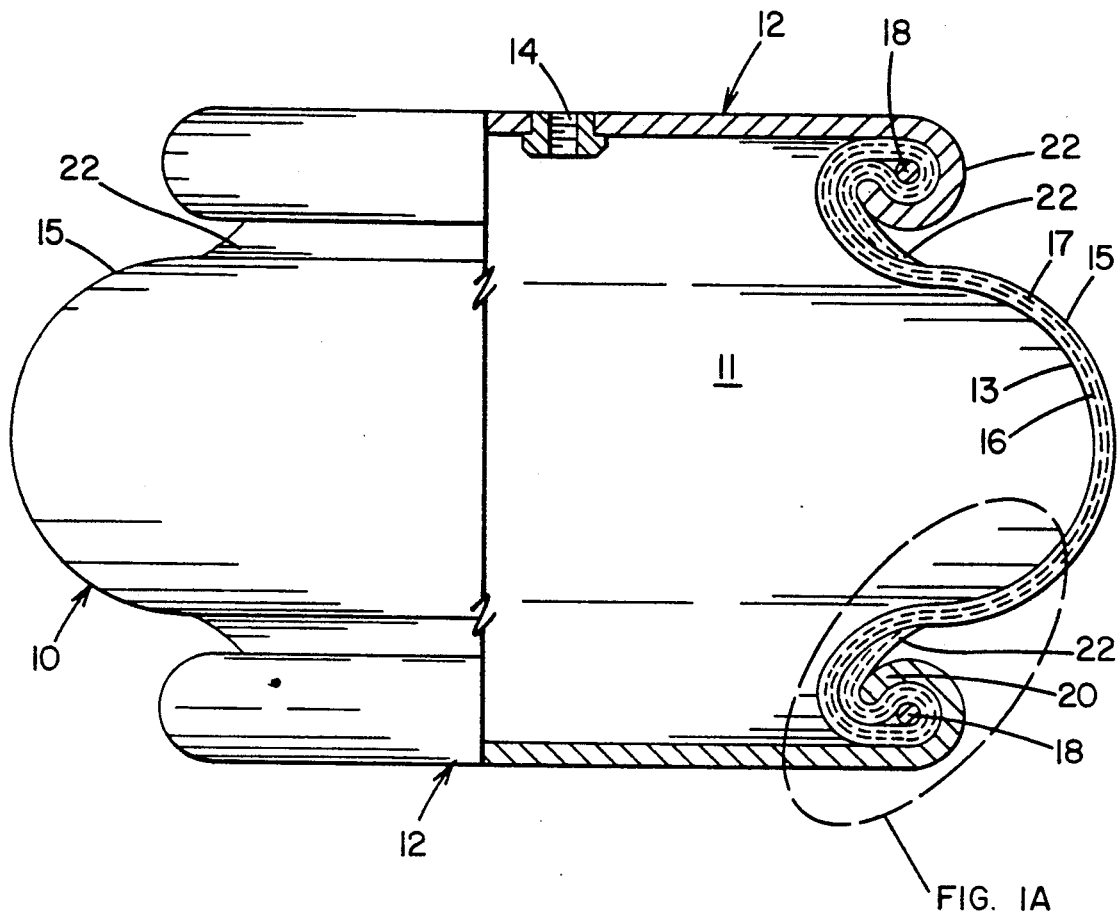
FIG. 1 is a side elevation partly in section of a fluid pressure device of the present invention.
Figure 1A:
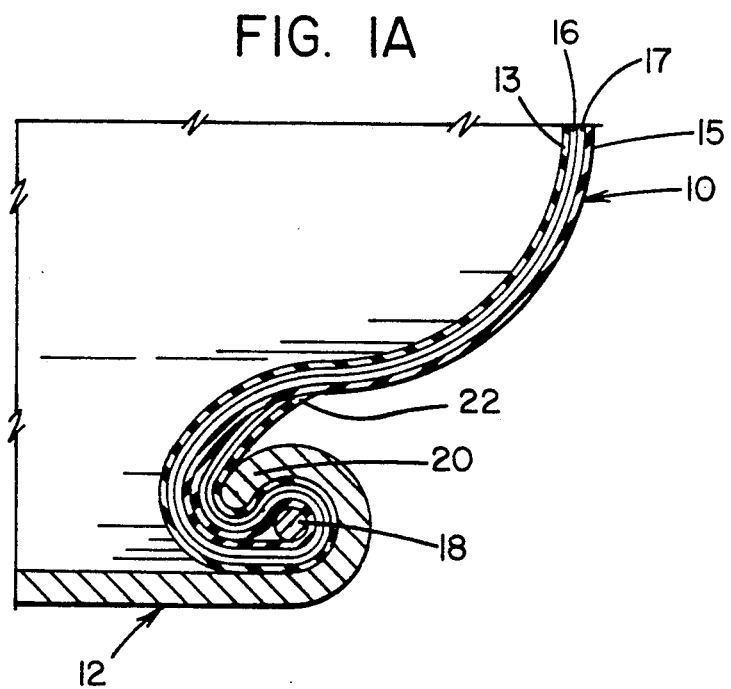
FIG. 1A is an enlarged detail of FIG. 1 showing the fluid pressure sleeve to end member connection.

FIG. 1 illustrates a fluid pressure device having an elastomeric fluid pressure sleeve 10 connected between a pair of end members 12,12. One of the end members 12 generally has an opening 14 for introducing fluid pressure into pressure chamber 11.

The fluid pressure sleeve 10 is usually built of two plies 16 and 17 of rubberized fabric, the plies having cords which extend at opposite angles from the axial direction. The sleeve 10 is preferably further comprised of an innerliner 13 of an air impervious elastomer such as polychloroprene or halobutyl and a cover layer 15 of an elastomer which is abrasion resistant and oil resistant.

The sleeve is generally built in a cylindrical shape then either vulcanized in that shape for sleeve used in rolling lobe type devices or vulcanized in a mold such as illustrated in U.S. Pat. No. 4,673,168 into a molded bellows type sleeve.

To assemble the fluid pressure device of the present invention, an end portion 22 of a vulcanized sleeve 10 is wrapped around a bead ring or wire 18 and then placed within an annular rolled end 20 of an end member 12. The rolled end 20 is then crimped about the wrapped bead 18.

By vulcanizing the sleeves without the beads present, it has been found that the vulcanization time can be reduced to about 50-55% of that of a sleeve with a molded-in bead, thus, making the process more cost and energy efficient.

It can be appreciated that while the invention has been illustrated as a single convolution molded sleeve, it can also be used with multi-convoluted sleeves as well as with sleeves used in rolling lobe type devices where one or both of the end members are the commonly-known piston variety. In addition, while both end members have been illustrated as being connected according to the process of the present invention, only one of them need be, the other may be attached by a well-known swage ring operation.

The bead ring 18 can be made from any one of a number of metals or synthetic materials as a solid ring or they can be made of stranded and twisted wire with their ends mechanically fastened.

While certain representative embodiments and details have been shown for the purpose of illustrating the invention, it will be apparent to those skilled in this art that various changes and modifications may be made therein without departing from the spirit or scope of the invention.

What is claimed is:
1. A method of assembling a fluid pressure sleeve to an end member comprising:
(a) vulcanizing an elastomeric fluid pressure sleeve;
b) wrapping an end portion of said vulcanized sleeve about a bead ring;
(c) placing the wrapped bead ring into an end member; and
(d) crimping said end member about the wrapped bead ring.

* * * * *